Dec. 9, 1941.    J. W. OERTER ET AL    2,265,924
READING DEVICE
Filed Aug. 17, 1939    2 Sheets-Sheet 1

INVENTORS.
John W. Oerter
Robert N. Oerter, Sr.
BY Lancaster, Allwine and Rommel
ATTORNEYS.

Dec. 9, 1941.  J. W. OERTER ET AL  2,265,924
READING DEVICE
Filed Aug. 17, 1939  2 Sheets-Sheet 2

INVENTORS.
John W. Oerter
Robert N. Oerter, Sr.
BY Lancaster, Allwine Rommel
ATTORNEYS.

Patented Dec. 9, 1941

2,265,924

UNITED STATES PATENT OFFICE 2,265,924

READING DEVICE

John W. Oerter and Robert N. Oerter, Sr., Philadelphia, Pa.

Application August 17, 1939, Serial No. 290,706

3 Claims. (Cl. 35—35)

The present invention relates to improvements in reading devices.

Especially within the last decade there has been an increasing emphasis on the importance of reading. But many writers point out that most people are poor readers. Inefficiency in reading may come from the lack of training the mind to operate quickly, improper control of the muscles of the eyes or lack of concentration. The primary object of this invention is to remedy these causes of poor reading, thus making a greater amount of reading more pleasurable and profitable.

Another object of the invention is to provide means to support an open book with its opposite leaves in a predetermined plane.

A further object of the invention resides in the provision of means to support any one of a plurality of open books of various thickness with its opposite leaves in a predetermined plane.

Yet another object is to provide means to support an open book with its opposite leaves in a predetermined plane and means to hold the opposite leaves in said plane.

A still further object is to provide an improved line indicating device.

The invention also aims to provide means for indicating successive lines of a work, such as a book or paper, as the lines are read, and means for dividing each line into parts, each part of a length to be taken in by the eyes at a single fixation, the usual number of words included in a fixation being approximately three.

Other objects and advantages of the invention will be apparent from the following detailed description, taken in connection with the accompanying drawings, forming a part of this specification and in which drawings.

Figure 1:
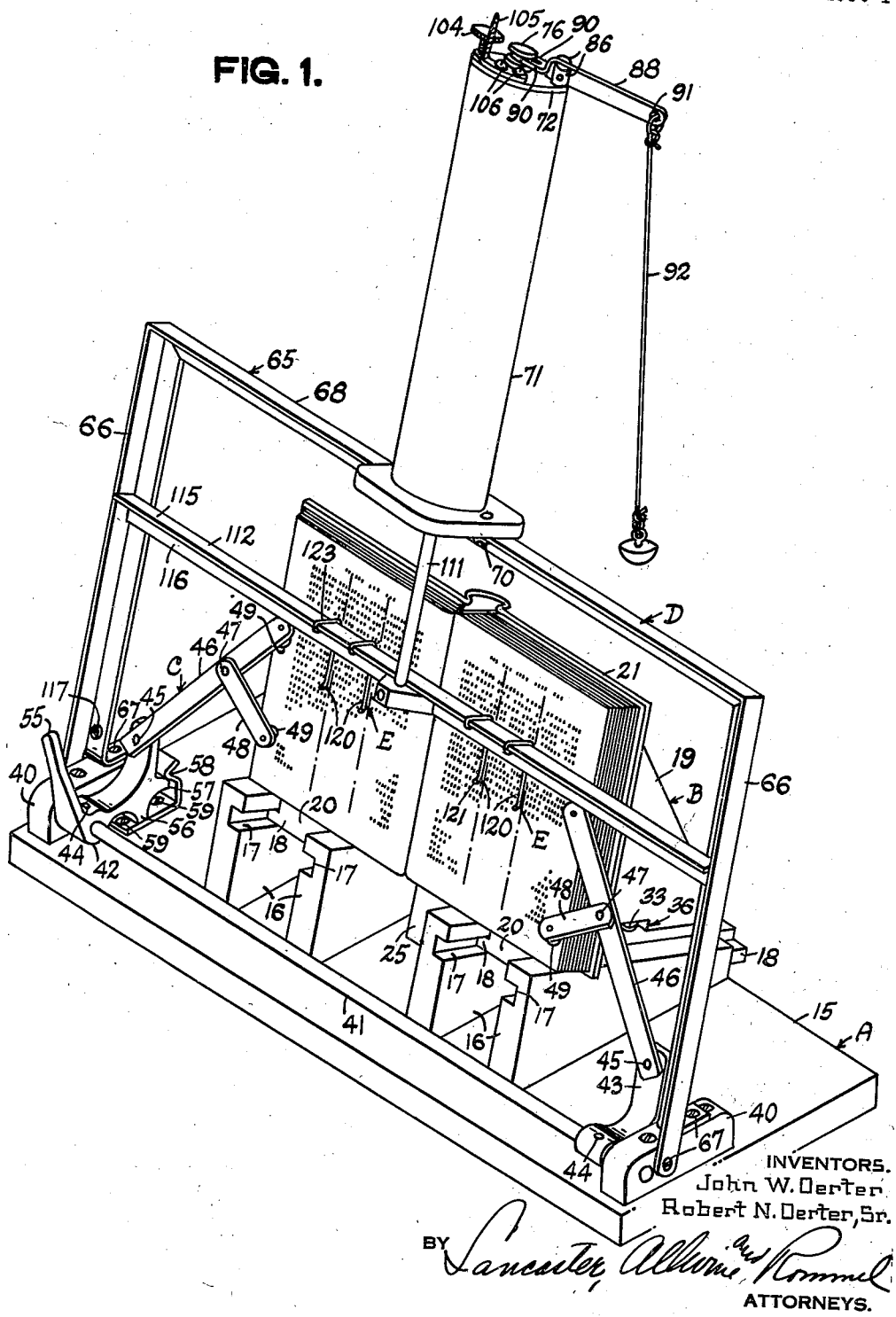
Figure 1 is a perspective view of the improved reading device, looking toward the front and right side thereof, and showing an open book mounted therein.
Figure 2:
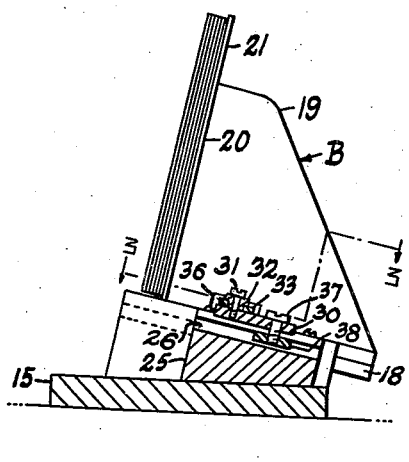
Figure 2 is a central vertical cross sectional view of book support means preferably forming a part of the invention, the view being taken substantially on the line 2—2 of Figure 3.
Figure 3:
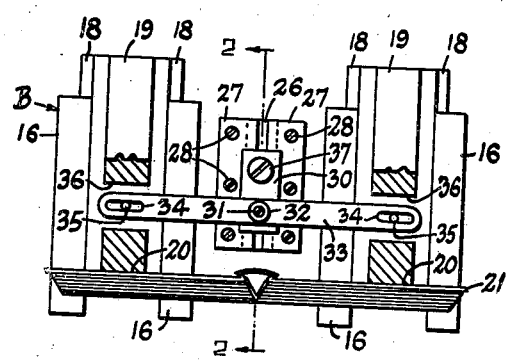
Figure 3 is a view partly in top plan and partly in horizontal section, substantially on the line 3—3 of Figure 2.
Figures 4, 5, 6:
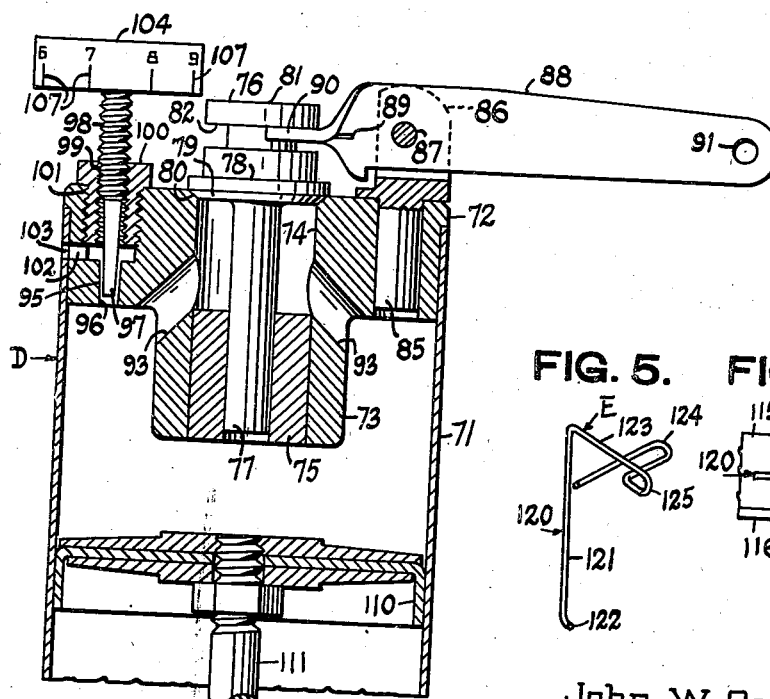
Figure 4 is a vertical sectional detail view of pneumatic control means preferably forming a part of the invention.
Figure 5 is a perspective view of a line divider preferably forming a part of the invention.
Figure 6 is a bottom plan view showing the line divider mounted on a portion of the reading device.

In the drawings, which for the purpose of illustration show only a preferred embodiment of the invention, and wherein similar reference characters denote corresponding parts throughout the several views, A designates the reading device, comprising means B to support any one of a plurality of books of various thicknesses in open position with its opposite pages in a predetermined plane, means C to hold the opposite pages in said predetermined plane, means D to indicate successive lines of reading matter on said pages, and means E to divide the lines into parts containing reading matter capable of assimilation at a single fixation of the eyes.

The entire reading device A preferably is mounted on a suitable horizontal base 15.

Means B to support any one of a plurality of books in open position with its opposite pages in a predetermined plane provides not only for the constantly changing ratio of pages at opposite sides of a book as reading of the book progresses, but also for differences in the total number of pages and thickness of various books. Fixed on the base 15 are spaced blocks 16 arranged in pairs, and provided with inclined grooves 17 co-acting with tongues 18 to slidably mount a pair of book supports 19 for movement in parallel paths inclining transversely of the base 15. These book supports 19 include inclined forward faces against which the opposite sides of a given book 21 may lean, while resting on the blocks 16. In the example shown, the faces 20 are disposed at right angles to the path of travel of the supports.

Fixed on the base 15 intermediate the blocks 16 is a block 25 provided with an undercut groove 26 parallel to the inclined grooves 17. In the example shown, the undercut groove 26 is formed between and beneath plates 27 secured to opposite sides of the block 25, as by screws 28. Slidably mounted for movement along the groove 26 is a fulcrum plate 30, pivotally supporting, as by cap screw 31 and collar 32, the intermediate portion of a lever 33. This lever 33 may be formed of strip metal with longitudinal slots 34 at opposite end portions, co-acting with pins 35 fixed on the book supports 19. The supports 19 may be provided with openings 36 to permit placement of the pins 35 centrally of the supports 19, as shown.

Extending thru the fulcrum plate 30 is a cap screw 37 in threaded engagement with cross piece 38 spanning the undercut groove 26. By turning cap screw 37, the cross piece 38 may be brought into clamping engagement with plates 27, whereby to secure the fulcrum plate 30 against sliding movement in the groove 26. This is done after the fulcrum plate is adjusted to dispose the opposite pages of a given size book 21 in a predetermined plane.

Means C to hold the opposite pages of the book in a predetermined plane will now be described. Mounted in spaced bearings 40 fixed to the base 15 is a rock shaft 41 including bracket arms 42, 43 fixed as by taper pins 44 to swing with the rock shaft. Pivotally secured to the free ends of these bracket arms, as by pins 45, are fingers 46, provided intermediate their ends with pins 47, pivotally supporting suitable branch fingers 48. The pins 45, 47 preferably bind sufficiently to secure the fingers 46, 48 against casual displacement from any position of adjustment. At their free end portions, the fingers may be provided with rubber buttons 49 for frictional engagement with the outer margins of opposite pages of the book.

Preferably integral with the left hand bracket arm 42 is a handle 55 for bringing the fingers 46, 48 forward when a page of the book is to be turned, a stop 56 for limiting backward movement of the fingers beyond a predetermined reading plane wherein the opposite pages of the book are disposed, and a dog 57 adapted to ride into engagement with a spring catch 58 fixed on base 15 as by screws 59, to secure the fingers against unintentional displacement from said reading plane. The stop 56, in limiting backward movement of the fingers 46, 48, determines the reading plane in which the opposite pages of any one of a plurality of open books of various sizes are alignable thru the provision of means B.

In order to indicate successive lines of reading matter contained in opposite pages of a book carried by the reading device, means D is provided. Lying in an inclined plane parallel to and slightly forwardly of the reading plane in which the opposite pages of the open book are disposed is an inverted U-shaped frame 65, preferably formed of metal of angular shape in cross-section, and including side members 66, fixed at their lower end portions to the bearings 40, as by screws 67, and a cross member 68 extending between the upper end portions of the side members 66.

Mounted on the cross member 68 intermediate its ends, as by suitable screw means 70, is a hollow cylinder 71, in the upper end of which is tightly fitted a cylindrical valve-body 72. This valve-body 72 may include a depending axial boss 73 and an axial bore 74. Tightly fitted in the boss 73 is a bushing 75 guiding a reciprocable valve 76 by its stem 77. This valve 76 may include a circular head 78 beveled at 79 to close against seat 80, and a cylindrical extension 81 projecting from the head and provided in its periphery with an annular groove 82. Tightly fitted in the valve-body 72 is a post 85 forked at its upper end portion to provide spaced lugs 86. Pivotally secured between the lugs 86, as by pin 87, is a lever 88 having one end portion twisted and bifurcated at 89 to provide fingers 90 disposed in the annular groove 82 of the valve. The opposite end portion of the lever 88 may be provided with an opening 91 to facilitate attachment of a suitable pull cord 92. At the juncture of the boss 73 with the remainder of the valve-body, there may be provided a plurality of spaced passageways 93 communicating with the bore 74 so that lifting of the valve 76 from its seat 80 will permit rapid flow of air in either direction thru bore 74 and passageways 93. The valve 76 may of course be readily lifted to its open position by pulling cord 92. Upon release of the cord, valve 76 will, because of its weight, drop to its closed position.

Extending thru the valve body in spaced parallel relation to valve 76 is an opening 95, defined at its lower end by a downwardly tapering seat 96. Co-acting with the seat is a tapering needle valve 97 having a stem 98 engaged by screw screads 99 with the inside of a sleeve 100, the outside of which sleeve is engaged by screw threads 101 with the walls of opening 95. Extending laterally outwardly from the opening 95 is a vent duct 102 including an aperture 103 in the wall of cylinder 71. The stem 98 may be rotated as by knob 104 to move the valve into or out of engagement with the valve seat 96, whereby to close or gradually open the valve. If desired, a suitable gauge 105 may be fixed, as by screws 106, to the valve body 72 for co-action with graduations 107 on the knob 104, to indicate the position of the valve 97.

In the cylinder 71 is a piston 110 provided with a depending rod 111 rigidly secured at its lower end to a transverse line indicating bar 112, having its opposite end portions slidably engaging the uprights 66. Of angular shape in cross section, this bar 112 includes forwardly and downwardly projecting flanges 115, 116 respectively. If desired, suitable abutment means 117 may be provided on frame 65 to limit downward movement of the bar 112.

Referring now to means E to divide the lines indicated by the bar 112 into parts containing subject matter capable of assimilation at a single fixation of the eyes, the same comprises a plurality of dividers 120, formed of relatively thin wire. Each divider 120 may comprise a downwardly extending portion 121 engaging the downwardly projecting flange 116 of bar 112 and terminating in a forwardly bent tip 122, a forwardly extending portion 123 slidably resting on the forwardly projecting flange 115 of bar 112, and a laterally extending bight portion 124 subjacent the flange 115 and connected to the forwardly extending portion 123, as by loop 125.

In the operation of the reading device A, the book to be read is placed against supports 19 and the fulcrum plate 30 moved forward until the two sides of the book engage fingers 46, 48, which have of course been adjusted to the width of the open book. When the valves 76 and 97 are closed, the line indicating bar cannot fall because the cylinder 71 is then airtight above piston 110. The valve 97 may be gradually opened by turning knob 104 to let the bar 112 drop at any desired speed. As the bar moves down the page, it compels the eyes to keep moving, the line dividers 120 separating each successive line into parts taken in by the eyes at a single fixation, the usual number of words in each part being approximately three. When the bottom of the page is reached, the bar 112 is raised by hand, the piston 110 forcing air against valve head 79 whereby to open the valve 76 and permit the escape of air from the cylinder. In order to turn a page of the book, lever 55 is operated to pull the fingers 46, 48 forward, then the page is turned, and the fingers are replaced by pushing lever 55 until dog 57 is engaged by spring catch 58. As progress thru the book is made by the reader, the pivoted lever 33 swings to permit relative movement of the book supports 19 so that the opposite pages are kept in the same plane in spite of the fact that the number of pages resting against each support is constantly changing. Whenever reading at a given speed becomes easy, the knob 104 is adjusted to increase the velocity with which the bar 112 falls.

Various changes may be made in the form of invention herein shown and described, without departing from the spirit of the invention or the scope of the following claims.

We claim:

1. A line indicating device for use in reading, said device comprising a support for the reading material, a line indicator movable in and opposite to the direction of reading, and means controlling movement of the indicator comprising a cylinder including a closed end portion, a piston reciprocable in the cylinder, means connecting the piston and indicator, a valve providing for gradual passage of fluid thru said closed end portion to permit movement of said indicator in the direction of reading, a second valve automatically opening to provide for rapid passage of fluid thru said closed end portion to permit movement of said indicator in a direction opposite to the direction of reading, and means to manually open the second valve to permit rapid movement of said indicator in the direction of reading.

2. A line indicating device for use in reading lines of a sheet of reading material, said device comprising a support for the sheet, a line indicating bar movable between the head and foot of the sheet, and means controlling movement of the bar comprising a cylinder including a closed end portion, a piston in the cylinder, means connecting the piston and bar, a valve providing for gradual passage of fluid thru said closed end portion to permit movement of said piston in a given direction, a second valve automatically opening to provide for rapid passage of fluid thru said closed end portion to permit movement of said piston in a direction opposite to said given direction, and means to manually open said second valve.

3. A reading device comprising a base, an open rectangular frame carried by the base and defining a reading zone in a predetermined plane, means adjustably mounted on said base to support any one of a plurality of open books of varying thickness with its opposite pages in the reading zone of said predetermined plane, a line indicating bar guided by said frame and movable parallel to said plane, means to control the movement of said bar, fingers normally to the rear of said frame for engaging the exposed pages of the book to hold them in said predetermined plane, and means pivotally mounting said fingers on said base to be movable in a plane parallel to said predetermined plane for adjustment to books of various widths and to be movable toward and from said predetermined plane to permit the fingers to be swung forwardly thru said frame to permit turning of the pages of the book.

JOHN W. OERTER.
ROBERT N. OERTER, Sr.